(12) United States Patent
Almkvist et al.

(10) Patent No.: US 11,701,945 B2
(45) Date of Patent: Jul. 18, 2023

(54) TEMPERATURE CONTROL SYSTEM FOR ELECTRIC VEHICLES

(71) Applicant: Volvo Car Corporation, Gothenburg (SE)

(72) Inventors: Göran Almkvist, Lerum (SE); Jonas Björkholtz, Kärna (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 17/500,134

(22) Filed: Oct. 13, 2021

(65) Prior Publication Data

US 2022/0118817 A1 Apr. 21, 2022

(30) Foreign Application Priority Data

Oct. 16, 2020 (EP) ..................................... 20202295

(51) Int. Cl.
*F25D 23/12* (2006.01)
*B60H 1/00* (2006.01)
*B60H 1/32* (2006.01)

(52) U.S. Cl.
CPC ......... *B60H 1/00278* (2013.01); *B60H 1/321* (2013.01); *B60H 1/3227* (2013.01); *B60H 2001/00307* (2013.01); *B60H 2001/3255* (2013.01)

(58) Field of Classification Search
CPC .. B60H 1/00278; B60H 1/321; B60H 1/3227; B60H 2001/00307; B60H 2001/3255
USPC .......................................................... 62/259
See application file for complete search history.

(56) References Cited

U.S. PATENT DOCUMENTS

| | | | |
|---|---|---|---|
| 2005/0061473 A1 | 3/2005 | Fletcher et al. | |
| 2010/0031972 A1* | 2/2010 | Royer, Jr. ............... | B64D 15/00 134/1 |
| 2011/0016896 A1 | 1/2011 | Oomura et al. | |
| 2014/0190189 A1 | 7/2014 | Kowsky et al. | |

FOREIGN PATENT DOCUMENTS

| | | | |
|---|---|---|---|
| CN | 2937957 Y | | 8/2007 |
| CN | 104180556 | * | 12/2014 |
| CN | 104180556 A | | 12/2014 |
| CN | 105799450 A | | 7/2016 |
| CN | 108955320 A | | 12/2018 |
| JP | 06265291 A | | 9/1994 |

(Continued)

*Primary Examiner* — Davis D Hwu
(74) *Attorney, Agent, or Firm* — Amin, Turocy & Watson, LLP

(57) ABSTRACT

The invention relates to a thermal control system for an electric vehicle comprising: a high voltage battery; a first heat exchanger adapted to be in contact with the ambient for circulating a heat exchange medium in thermal contact with the ambient; a second heat exchanger in thermal contact with the battery; a heat transport system for transporting the heat exchange medium from the first heat exchanger to an evaporator/condenser assembly that is in thermal contact with the second heat exchanger for transfer of heat to the battery and for transporting the heat exchange medium back to the first heat exchanger. At least one of the first and second heat exchangers is provided with a vibration device, such as an ultrasonic transducer, for releasing of ice formed on the at least one heat exchanger.

20 Claims, 2 Drawing Sheets

(56) References Cited

FOREIGN PATENT DOCUMENTS

| | | |
|---|---|---|
| JP | H06265291 A | 9/1994 |
| JP | H06265291 A1 | 9/1994 |
| JP | 2007120933 A | 5/2007 |
| WO | 2014143621 A1 | 9/2014 |

* cited by examiner

TEMPERATURE CONTROL SYSTEM FOR ELECTRIC VEHICLES

CROSS-REFERENCE TO RELATED APPLICATIONS

This application claims priority to EP Patent Application No. 20202295.0, filed on 16 Oct. 2020, entitled "Temperature control system for electric vehicles." The entirety of the aforementioned application is hereby incorporated herein by reference.

TECHNICAL FIELD

The invention relates to a thermal control system for an electric vehicle comprising: a high voltage battery; a first heat exchanger adapted to be in contact with the ambient for circulating a heat exchange medium in thermal contact with the ambient; a second heat exchanger in thermal contact with the battery; and a heat transport system for transporting the heat exchange medium from the first heat exchanger to an evaporator/condenser assembly that is in thermal contact with the second heat exchanger for transfer of heat to the battery, and transporting the heat exchange medium back to the first heat exchanger.

The invention also relates to an electric vehicle comprising such a temperature control system.

BACKGROUND ART

For battery powered electric vehicles (BEV) at lower temperatures, both the cabin and the battery need to be heated. The required heating power is provided by the high voltage battery pack of the vehicle and reduces the range for driving. The use of a heat pump for transporting heat from the ambient air to the cabin and battery provides an energy-effective way of heating. At temperatures below 5° C., ice formation on the main heat exchanger reduces the air flow through the heat exchanger and reduces the heat exchanger's effectiveness. In order to de-ice the heat exchanger, the heat pump flow can be reversed for heating of the heat exchanger, but this results in a relatively complex system and relatively high energy use.

SUMMARY OF THE INVENTION

It is an object of the present invention to provide a thermal control system in which ice formation on the heat exchanger can be reduced, which is of a relatively simple and compact design and which has a relatively low power consumption.

Hereto a thermal control system according to the invention is provided wherein at least one of the first and second heat exchangers is provided with a vibration device for the releasing of ice formed on the at least one heat exchanger.

The vibration device can be of a relatively compact design that can be coupled to the main heat exchanger and/or to the heat exchanger of the battery, for effective transfer of mechanical energy and obviates the need for a redesign of the circuits of the heat exchange medium. The removal of ice by the vibration device according to the invention allows effective use of a heat pump in colder climates and results in an energy saving of up to 20% (Worldwide Harmonized Light duty driving Test Cycle (WLTC) at 0 degrees Celsius (° C.)) and an extended driving range.

In an embodiment of a thermal control system according to the invention, the vibration device comprises an ultrasonic transducer that is placed on the first heat exchanger and that is adapted to generate sonic waves along an outer surface of the heat exchanger, which outer surface forms an interface with an ice layer, for melting ice, such as by causing cavitation bubbles, at the interface layer.

The ultrasonic waves that are generated by the transducer can travel along the interface layer where they can cause a phase change of the ice at the interface, such that the ice is easily released from the heat exchanger without the need for melting of all the ice. This provides a large energy saving. The ultrasound generates cavitation bubbles at the interface layer which results in high shear forces and stress expelling the ice from the surface. When the vehicle is moving, the vibrations and shocks from driving assist in the removal of ice from the heat exchanger surface. In case of laminar flow through the heat exchanger at low Reynolds numbers, that occur for instance in low flow conditions, it was found that the ultrasonic waves cause increased turbulence in the heating medium and result in an increase in heat transfer.

The ultrasonic transducer my operate at frequencies between 20 kilohertz (kHz) and 5 MHz.

A further embodiment of a thermal control system according to the invention comprises a control unit connected to a temperature sensor for measuring an ambient temperature, which control unit switches on the ultrasonic transducer when the sensor measures an ambient temperature below a defined threshold value. The controller may be adapted to: switch on the ultrasonic transducer continuously when the temperature sensor measures a temperature below a lower threshold value; switch the ultrasonic transducer on and off with on and off periods of substantially similar duration when the temperature sensor measures a temperature below an upper threshold value and above the lower threshold value; and switch the ultrasonic transducer on and off with an on period which is smaller than half the off period when the temperature sensor measures a temperature above the upper threshold value.

In this way, the transducer is operated for de-icing of the heat exchanger at low temperatures, such as −15° C. and lower, while in a mid-temperature range (e.g. −15° C.-5° C.) and a high temperature range (above 5° C.), the transducer is operated to provide increased heat transfer in the heat exchanger. For temperatures between the lower threshold value and the high threshold value the on and off periods may be between 300 seconds (s) and 600 s, while for temperatures above the upper threshold value the on period can be set between 50 s and 150 s and the off period between 5 and 10 times the on period.

The transducer may be coupled to the heat exchanger via a connector body that conducts ultrasonic vibrations to the heat exchanger at frequencies between 20 kHz and 100 kHz, preferably between 30 kHz and 50 kHz. The connector body may comprise a metal bar which extends across the width of the heat exchanger and has a mass that is adapted to match the resonant frequency of the heat exchanger to the transducer.

BRIEF DESCRIPTION OF THE DRAWINGS

An embodiment of a thermal control system for an electric vehicle according to the invention will, by way of non-limiting example, be described in detail with reference to the accompanying drawings. In the drawings.

DESCRIPTION OF EMBODIMENTS

Figure 1:
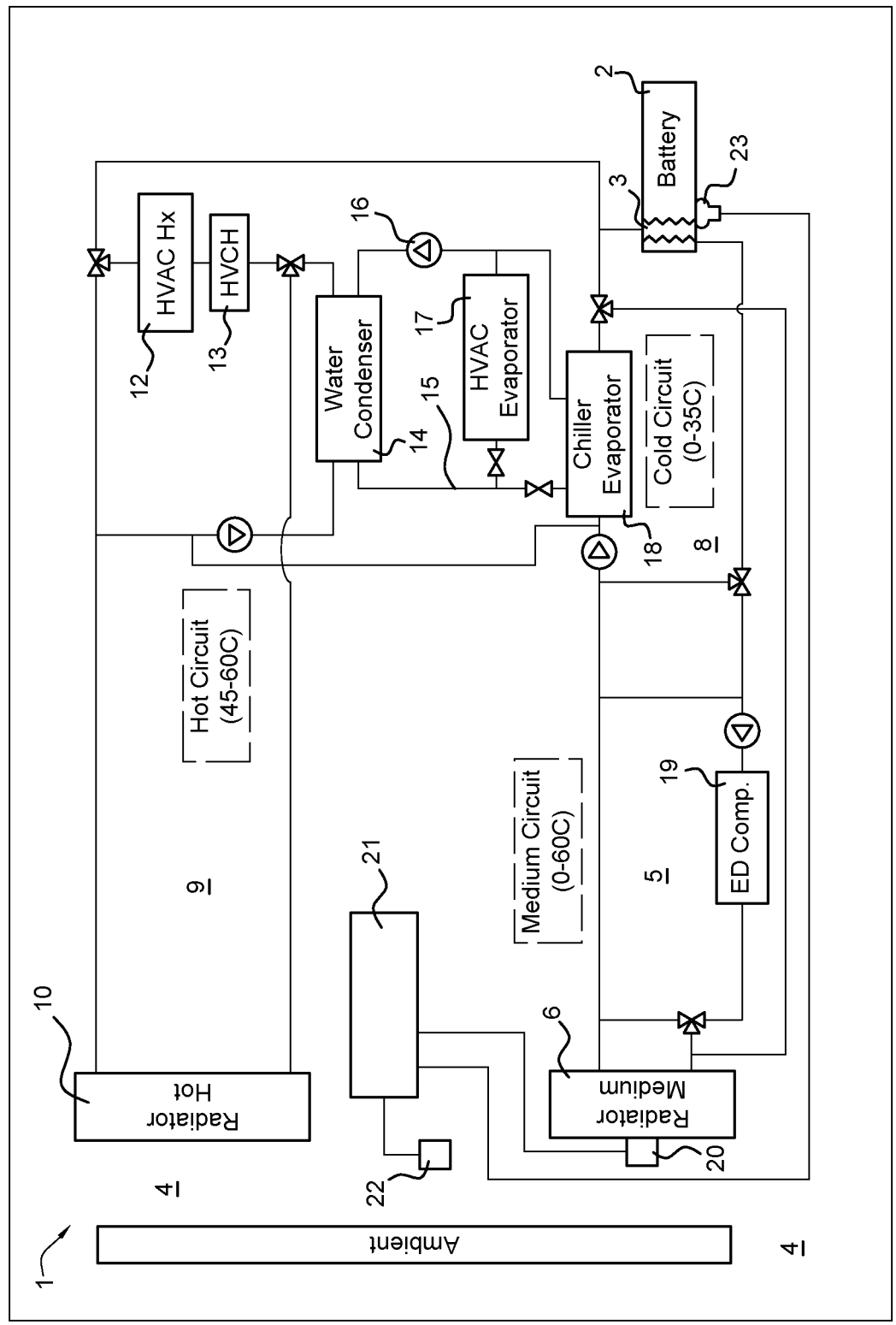
FIG. 1 depicts a schematic lay out of the thermal control system according to the present invention.

FIG. 1 shows a thermal control system 1 for a battery powered electric vehicle, having a high voltage battery 2 that powers the drive train and the on-board electric devices of the vehicle. The system 1 comprises a medium temperature circuit 5 connected to a medium temperature radiator 6, forming a heat pump for transfer of heat from the ambient 4 for heating of the battery 2 via a heat exchanger 3 at low temperatures.

A cold circuit 8 is provided for cooling of the battery 2 at operational temperatures above 5° C. and a hot circuit 9 is connected to a high temperature radiator 10 for transfer of heat to the ambient 4 for cooling of the cabin and for cooling of the battery 2 at higher operational temperatures.

The hot circuit 9 comprises a heating, ventilation and air conditioning (HVAC) heat exchanger 12 in the cabin, a high voltage coolant heater (HVCH) 13 that is powered by the battery 2 and a water condenser 14. The cold circuit 8 comprises a chiller evaporator 18 that connects to the heat exchanger 3 of the battery 2. The hot circuit 9 and cold circuit 8 are thermally coupled via a compression/expansion circuit 15. The chiller evaporator 18 is placed in parallel with a HVAC evaporator 17 that is connected to the water condenser 14 via a compressor 16. The medium temperature circuit 5 cools the electric drive (ED) components 19 such as stator, rotor and inverter, and connects to the chiller evaporator 18.

The radiator 6 of the medium temperature circuit 5 is provided with an ultrasonic transducer 20 that is connected to a controller 21 for switching on and off the transducer 20, based on the ambient temperature that is measured by a temperature sensor 22. A similar transducer 23 is attached to the heat exchanger 3 of the battery 2. The controller 21 may provide power to the transducers 20, 23 of for instance 35W at a resonant frequency of the ultrasonic transducers of 40 kHz.

At temperatures below 5° C., the battery 2 is heated via the HVCH unit 13 and by the heating medium at ambient temperature that is supplied from the medium temperature radiator 6 to the chiller/evaporator 18 and that is transported subsequently via water condenser 18 and HVCH unit to the battery 2.

The controller 21 at temperatures below −15° C., activates the ultrasonic transducers 6, 23 to be in a constant on state, such that ultrasonic waves on the outer surfaces of the radiators 6, 23 are generated for ice removal. At temperatures between −15° C. and +5° C., the controller 21 alternatingly switches on the transducers 6, 23 for 500 s and switches the transducers off for 500 s. At ambient temperatures above +5° C. the controller 21 alternatingly switches on the transducers for 100 s and switches them off for 900 s in order to improve heat transfer by the heating medium by turbulence generated in the heating medium by the sonic waves.

Figure 2:
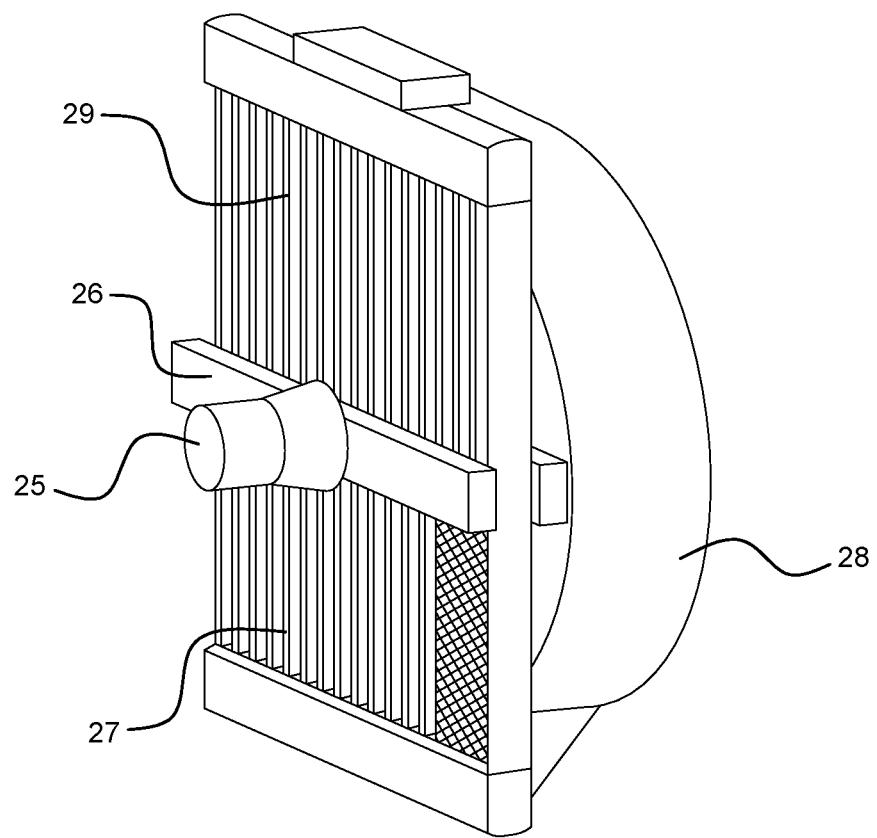
FIG. 2 depicts a perspective view of an ultrasonic transducer mounted on the outer surface of a radiator.

FIG. 2 shows a perspective view of an ultrasonic transducer 25 that is connected to a bar 26 forming a mechanical interface coupling the transducer 25 to the outer surface 29 of the radiator 27. The bar 26 is of such a thickness that the resonant frequency of the radiator 27 is matched with the frequency of the transducer 25. Instead of on the outer surface 29, it is possible to mount the transducer 25 on a circumferential side surface of the radiator 27. The removal of ice from the radiator surface 29 warrants an unrestricted flow of air drawn through the radiator by the fan 28.

By use of the ultrasonic transducer 25, a heat pump can effectively be used in battery driven electric vehicles in colder climates instead of an electric heater, so that up to 20% energy savings (WLTC at 0° C.) and a total battery capacity saving of 1 kWh can be achieved.

While the invention has been described with reference to exemplary embodiments, it will be understood by those skilled in the art that various changes may be made and equivalents may be substituted for elements thereof without departing from the scope of the invention. The controller disclosed can include a special purpose computer (which could include one or more processors and/or memory) programmed to perform the required steps. In addition, many modifications may be made to adapt a particular situation or material to the teachings of the invention without departing from the essential scope thereof. Therefore, it is intended that the invention not be limited to the particular or preferred embodiments disclosed, but that the invention will include all embodiments falling within the scope of the appended claims.

The invention claimed is:

1. A thermal control system for an electric vehicle comprising:
   a high voltage battery;
   a first heat exchanger adapted to be in contact with ambient air for circulating a heat exchange medium in thermal contact with the ambient air;
   a second heat exchanger in thermal contact with the high voltage battery;
   a heat transport system for transporting the heat exchange medium from the first heat exchanger to an evaporator/condenser assembly that is in thermal contact with the second heat exchanger for transfer of heat to the high voltage battery and for transporting the heat exchange medium back to the first heat exchanger; and
   at least one of the first heat exchanger or the second heat exchanger being provided with a vibration device for releasing of ice formed on the at least one of the first heat exchanger or the second heat exchanger, the vibration device comprising an ultrasonic transducer that is placed on the at least one of the first heat exchanger or the second heat exchanger and that is adapted to generate sonic waves along an outer surface of the at least one of the first heat exchanger or the second heat exchanger, the outer surface forming an interface with an ice layer, for melting ice at the interface.

2. The thermal control system according to claim 1, the ultrasonic transducer operating at a frequency between 20 kilohertz (kHz) and 5 megahertz (MHz).

3. The thermal control system according to claim 1, further comprising:
   a control unit connected to a temperature sensor for measuring an ambient temperature, the control unit switching on the ultrasonic transducer when the temperature sensor measures the ambient temperature below a defined threshold value.

4. The thermal control system according to claim 3, the control unit being adapted to:
   switch on the ultrasonic transducer continuously when the temperature sensor measures a first ambient temperature below a lower threshold value;
   switch the ultrasonic transducer on and off with a first on period and a first off period of substantially similar duration when the temperature sensor measures a second ambient temperature below an upper threshold value and above the lower threshold value; and switching the ultrasonic transducer on and off with a second on period which is smaller than half a second off period when the temperature sensor measures a third ambient temperature above the upper threshold value.

5. The thermal control system according to claim 4, the first on period and the first off period being between 300 seconds and 600 seconds; and the second on period being between 50 seconds and 150 seconds and the second off period being between 5 and 10 times the second on period.

6. The thermal control system according to claim 1, wherein the ultrasonic transducer is coupled to the of the first heat exchanger or the second heat exchanger via a connector body that conducts ultrasonic vibrations to the of the first heat exchanger or the second heat exchanger at frequencies between 20 kilohertz (KHz) and 100 kHz.

7. The thermal control system according to claim 6, wherein the ultrasonic transducer is coupled to the of the first heat exchanger or the second heat exchanger via the connector body that conducts ultrasonic vibrations to the of the first heat exchanger or the second heat exchanger at frequencies between 30 and 50 kHz.

8. An electric vehicle comprising a thermal control system, the thermal control system comprising:
a high voltage battery;
a first heat exchanger adapted to be in contact with ambient air for circulating a heat exchange medium in thermal contact with the ambient air;
a second heat exchanger in thermal contact with the high voltage battery;
a heat transport system for transporting the heat exchange medium from the first heat exchanger to an evaporator/condenser assembly that is in thermal contact with the second heat exchanger for transfer of heat to the high voltage battery and for transporting the heat exchange medium back to the first heat exchanger; and
at least one of the first heat exchanger or the second heat exchanger being provided with a vibration device for releasing of ice formed on the at least one of the first heat exchanger or the second heat exchanger, the vibration device comprising an ultrasonic transducer that is placed on the at least one of the first heat exchanger or the second heat exchanger and that is adapted to generate sonic waves along an outer surface of the at least one of the first heat exchanger or the second heat exchanger, the outer surface forming an interface with an ice layer, for melting ice at the interface.

9. The electric vehicle according to claim 8, the ultrasonic transducer operating at a frequency between 20 kilohertz (kHz) and 5 megahertz (MHz).

10. The electric vehicle according to claim 8, the thermal control system further comprising:
a control unit connected to a temperature sensor for measuring an ambient temperature, the control unit switching on the ultrasonic transducer when the temperature sensor measures the ambient temperature below a defined threshold value.

11. The electric vehicle according to claim 10, the control unit being adapted to:
switch on the ultrasonic transducer continuously when the temperature sensor measures a first ambient temperature below a lower threshold value;
switch the ultrasonic transducer on and off with a first on period and a first off period of substantially similar duration when the temperature sensor measures a second ambient temperature below an upper threshold value and above the lower threshold value; and
switching the ultrasonic transducer on and off with a second on period which is smaller than half a second off period when the temperature sensor measures a third ambient temperature above the upper threshold value.

12. The electric vehicle according to claim 11, the first on period and the first off period being between 300 seconds and 600 seconds; and the second on period being between 50 seconds and 150 seconds and the second off period being between 5 and 10 times the second on period.

13. The electric vehicle according to claim 8, wherein the ultrasonic transducer is coupled to the of the first heat exchanger or the second heat exchanger via a connector body that conducts ultrasonic vibrations to the of the first heat exchanger or the second heat exchanger at frequencies between 20 kilohertz (KHz) and 100 kHz.

14. The electric vehicle according to claim 13, wherein the ultrasonic transducer is coupled to the of the first heat exchanger or the second heat exchanger via the connector body that conducts ultrasonic vibrations to the of the first heat exchanger or the second heat exchanger at frequencies between 30 and 50 kHz.

15. The electric vehicle according to claim 8, wherein the ultrasonic transducer is connected to a bar forming a mechanical interface coupling the transducer to the outer surface.

16. The electric vehicle according to claim 8, the evaporator/condenser assembly comprising a chill evaporator connected to the second heat exchanger.

17. The electric vehicle according to claim 16, the evaporator/condenser assembly comprising water condenser connected to the chill evaporator.

18. The thermal control system according to claim 1, wherein the ultrasonic transducer is connected to a bar forming a mechanical interface coupling the transducer to the outer surface.

19. The thermal control system according to claim 1, the evaporator/condenser assembly comprising a chill evaporator connected to the second heat exchanger.

20. The thermal control system according to claim 19, the evaporator/condenser assembly comprising water condenser connected to the chill evaporator.

* * * * *